Nov. 23, 1965 G. W. OUSLEY 3,218,703
HINGE WELDS FOR ROD WARHEAD
Filed July 14, 1958

INVENTOR.
GILBERT W. OUSLEY
BY
ATTYS.

United States Patent Office 3,218,703
Patented Nov. 23, 1965

3,218,703
HINGE WELDS FOR ROD WARHEAD
Gilbert W. Ousley, Washington, D.C., assignor to the United States of America as represented by the Secretary of the Navy
Filed July 14, 1958, Ser. No. 748,546
6 Claims. (Cl. 29—471.1)
(Granted under Title 35, U.S. Code (1952), sec. 266)

The invention described herein may be manufactured and used by or for the Government of the United States of America for governmental purposes without the payment of any royalties thereon or therefor.

The present invention relates generally to a method of welding superposed metal rods substantially at the end-portion thereof to form hinge joints thereat, and more particularly to an improved method of welding the rods of continuous-rod type warheads so as to form hinge welds upon which the rods pivot to form a continuous loop or ring when expanded by detonation of an explosive charge housed within the warhead.

In the copending application of M. L. Kempton, Serial No. 588,576, filed May 31, 1956 for "Rod Warhead" and assigned to the same assignee, there is disclosed a continuous-rod type of warhead which is in the shape of a hollow cylinder and basically comprises a plurality of cylindrically-arranged rods concentrically disposed within an outer cylindrically-arranged plurality of rods, the rod ends of the inner rod-cylinder being welded substantially to the end portions of the rods of the outer rod-cylinder to form hinge welds at the upper and lower ends of the warhead-cylinder. Upon detonation of an explosive charge positioned within the warhead-cylinder, the rods are propelled radially outward and pivot about the hinge welds to expand into a continuous loop or ring for projection into a target.

In the production of this type warhead, it has been the practice heretofore to join the rods of the outer cylinder to the rods of the inner cylinder by diagonally positioning the outer cylinder rods in a jig with a spacer between the rods, superposing the inner cylinder rods on the outer cylinder rods and welding a series of beads along the ends of the rods, as will be more fully explained hereinafter. The spacer and weld material between the rods are then milled out, with the excess weld on the outer surface of the rods being subsequently removed by grinding or machining. In order to perform these milling and grinding operations, this method required refined and time-consuming machining techniques. Moreover, the welding material, upon cooling and solidifying, contracted and warped the rods thereby resulting in distorted rod cylinders.

The general purpose of this invention is to provide a new and improved method of welding the rods of continuous-rod type warheads, which improved method is more facile and less expensive than the prior art method. In carrying out the method of the present invention, the end portions of each of the rods of the inner and outer cylinder are chamferred, or bevelled, on a pair of adjacent edges. The rods of the inner cylinder are then superposed on the rods of the outer cylinder in a suitable jig with the chamfers supercoincidentally positioned to form V-shaped troughs or notches on the sides of the rods between the abutting faces of the superposed rods. Weld material is then deposited in the troughs to bond the rods together substantially at the end portions. With the rods retained in the jig, the excess weld material is removed simply by passing a grinder or milling burr between adjacent rods in the jig.

With the foregoing in mind, it is an object of the invention to provide a new and improved method of welding the rods of continuous-rod type warheads.

It is another object to provide a relatively facile and inexpensive method of forming hinge welds on continuous-rod warheads in which the hinge welds are substantially symmetrical and uniform in bonding strength.

A further object is to weld the superposed rods of continuous-rod warheads by depositing welding material in grooves formed on the sides of the rods between the abutting faces of the rods.

An essential object of the invention is to provide a novel, facile and inexpensive method of welding a pair of superposed rods at a predetermined point to form a hinge weld-joint thereat.

Other objects and many of the attendant advantages of this invention will be readily appreciated as the same becomes better understood by reference to the following detailed description when considered in connection with the accompanying drawings in which like reference numerals designate like parts throughout the figures thereof and wherein.

Figure 5:
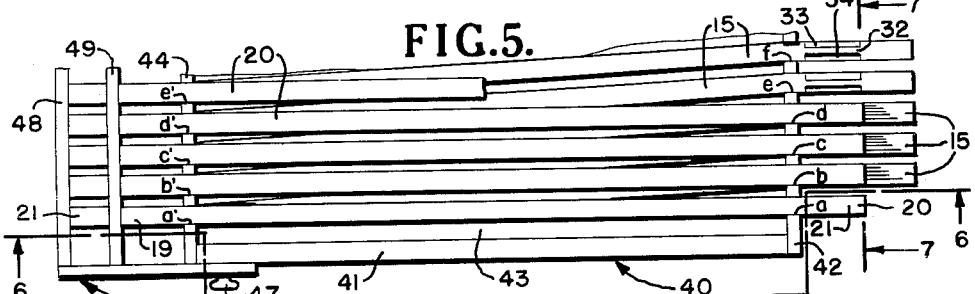
Figure 6:
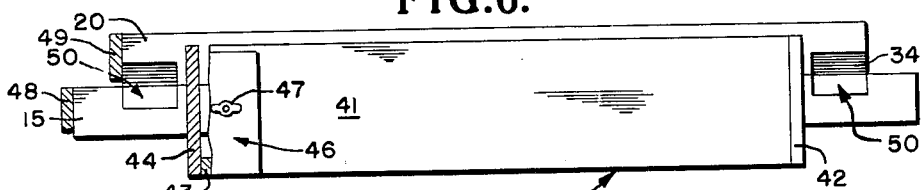
Figure 7:
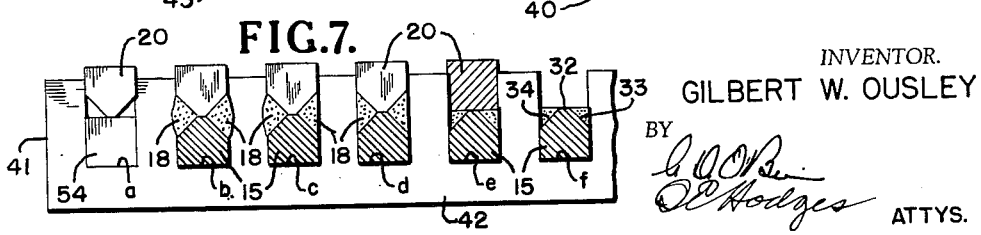

FIGS. 4(A) and 4(B) illustrate the ends of rods of square and circular cross-section, respectively, after completion of the chamfering operations;

FIG. 5 is a fragmentary plan view of the superpositioning of the rods in a jig for the subsequent welding and machining operations in accordance with the present invention;

FIG. 6 is a sectional elevation view through line 6—6 of FIG. 5 and illustrates the weld-receiving troughs formed on the sides of the rods between the abutting faces thereof; and FIG. 7 is a sectional end view through line 7—7 of FIG. 5 and illustrates the condition of the welded joints after completion of the weld depositing operation with the excess-weld removal operation partially completed.

Figure 1:
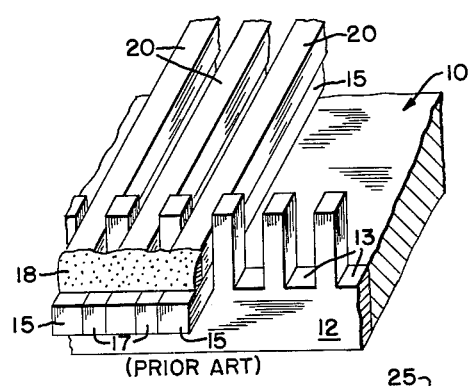
FIG. 1 is a fragmentary perspective representation of the prior manner of constructing hinge welds on continuous-rod warheads.
Figure 3:
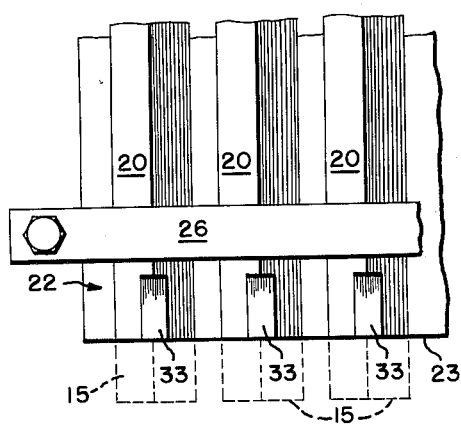
FIG. 3 is a plan view of the assembly shown in FIG. 2.

Referring now to FIG. 1, the prior art method shown therein employs a jig 10, shown in fragmentary perspective, having a front end-plate 12 with a plurality of identical, equi-spaced, slots or notches 13 in which are positioned the rods 15 and 20 to be welded. A rear endplate (not shown), identical to plate 12, is secured to the opposite end of jig 10. Since the rods of the outer-rod cylinder of the warhead are longer than the rods of the inner-rod cylinder of the warhead and connect opposite ends of adjacent rods of the inner cylinder, rods 15 which form the outer cylinder are longer than rods 20 and are diagonally positioned under rods 20 in the jig 10. Although the rods are shown as being of square cross-section, it is to be understood that rods 15 and 20 in all of the figures described herein may be of rectangular or circular cross-section. Also, it is to be understood that only a few rods are shown in all of the figures described herein for the sake of illustrative simplification; in practice, any number of rods suitable for the desired dimensions of the warhead may be used such, for example, as 50 to 200 of each of rods 15 and 20 in an accommodating jig.

After the rods 15 and 20 have been properly positioned, a metallic spacer 17 is forced between the ends of lower rods 15 to prevent the welding material, subsequently to be deposited, from dropping out between the ends of rods 15. Then, welding material 18 is deposited, by any of the conventional welding techniques, on the ends of rods 15 and against the face of the ends of rods 20, as shown, is being understood that the opposite ends of the rods are likewise welded. Upon cooling and solidification of the welding material, the spacers 17 and the welding material thereon are removed by milling or machining between the rods; and the rough weld joints, bonding rods 20 to rods 15, are substantially uniformly shaped by first machining the joints flush with the upper face of rods 20 and then machining the ends. After the machining operations are completed, the joined rods are removed from the jig. The product at this point is a plurality of alternatingly-connected long and short rods with the remote ends of the product being unconnected. In order to form a cylindrical continuous-rod warhead, the assemblage of joined rods is wrapped about a suitable mandrel and the aforesaid unconnected ends welded together, the final form being an elongated cylinder capable of expansion into an enlarged loop, as shown in the aforementioned copending application of M. L. Kempton.

It is apparent from the foregoing description that the prior manner of fabricating continuous-rod warheads not only requires numerous machining operations to remove the excess weld material but also requires meticulous, accurate and time-consuming machining techniques to remove the spacers 17 without disturbing the symmetry of the ends of rods 15. Moreover, since the large amount of deposited weld material causes distortion at the rod ends, this distortion makes accurate machining between the rods very difficult. Furthermore, the contraction of the weld material upon cooling is effective to warp the ends of the rods, resulting in asymmetrical rod ends which are not uniform in bonding strength.

In overcoming the deficiencies of the aforedescribed prior method, the improved method contemplated by the present invention comprises generally the steps of chamfering a pair of adjacent edges at the ends of short rods 20, chamfering a pair of adjacent edges at a distance from the ends of long rods 15 as to coincide with the chamfers of rods 20 when superpositionally centered on rods 15, superposing rods 20 on rods 15 in a jig with the coinciding chamfers of the rods forming a trough on each side of the superposed rods between the abutting faces thereof, depositing weld material in the troughs while the rods are retained in the jig, passing a grinder or milling-machine cutting tool to remove the excess weld so that the weld-joints are flush with the sides of the connected rod-ends, and thereafter forming the joined rods into a cylinder and connecting the remote ends thereof. Forming the hinge weld joints on the sides of the rods in the aforedescribed manner obviates the disadvantages present in the prior art method and results in substantially symmetrical weld joints which are substantially uniform in strength.

Figure 2:
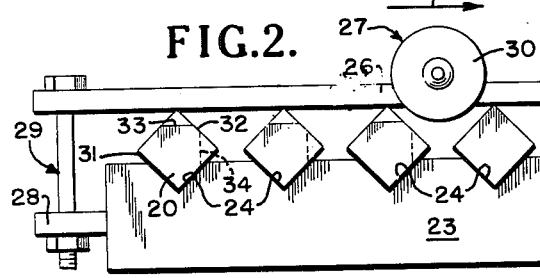
FIG. 2 is a fragmentary elevation of the jig assembly to perform the chamfering operation on the rods.

Referring now to FIGS. 2 to 7 which relate to the method of the present invention, FIG. 2 illustrates, in fragmentary elevation, the assembly set-up for performing the chamfering operations and utilizes a rectangular flat jig 22 having a plurality of parallel V-shaped channels 24 for receiving rods 15 or 20, rods 20 being shown in position in FIG. 2. Although the rods are placed in channels 24 so that their end faces are in linear alignment, the end faces of rods 20 are disposed coplanar with end face 23 of jig 10 for the chamfering operation; whereas the ends of rods 15, which are longer than rods 20, are positioned to extend beyond face 23 a predetermined distance, as more clearly illustrated in FIG. 3. In this manner, supercoincidence of the chamfers of rods 15 and 20 is assured when rods 20 are superposedly centered on rods 15. Although channels 24 are shown as V-shaped, it is to be understood that, if the rods are of rectangular or circular cross-section, the channels may be of suitable configuration.

A clamping bar 26 is secured at one end to anchor-eye 28 of jig 22 by nut-bolt assembly 29, the other end (not shown) of bar 26 being likewise secured to jig 22, to firmly hold the rods in place during the chamfering operation. A rotating grinding wheel 27, of a thickness conforming to the desired length (preferably ½ to ¾ inch) of the chamfer and disposed with its front-face 30 coplanar with jig-face 23, is linearly carried in the direction of the arrow 25 by any conventional assembly-line means (not shown) to traverse the uppermost edges of the rods, thereby bevelling the edges of the rods to form chamfers 33 is illustrated by the first three rods in FIG. 2. The opposite ends (not shown) of the rods are likewise chamfered preferably simultaneously by another grinding wheel (not shown) mounted on the same shaft as grinding wheel 27. After chamfers 33 are formed, clamping bar 26 is loosened and the rods are rotated 90 degrees counterclockwise to seat edge 31 of the rods in the apex of channels 24 whereupon the aforedescribed chamfering procedure is repeated to form chamfers 34, indicated by dotted lines in FIG. 2. As is stated hereinbefore and as is more apparent from FIG. 3, the chamfers are formed on the ends of rods 20; whereas, on the longer rods 15, the chamfers are spaced (preferably ½ to 1 inch) from the end of the rods to form recesses near the endportions of the rods, the recesses being in coincidence with the chamfers of rods 15 when superposedly centered on rods 20.

Figure 4:
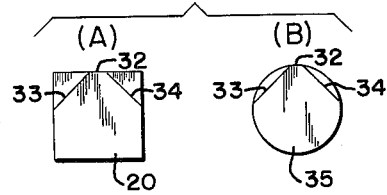

In lieu of a grinding wheel, a milling machine or any other suitable apparatus may be utilized to form the chamfers 33 and 34. The depth of cut of the grinding wheel or milling machine is such as to leave a ridge 32 between chamfers 33 and 34, although if desired a shallower or deeper cut may be made. The appearance of the ends of the shorter rods 20 is depicted in FIG. 4 where (A) and (B) represent rods of square and circular cross-section, respectively.

In describing the manner of relative superpositioning of the rods 15 and 20, reference is now made to FIGS. 5 and 6 wherein is illustrated a portion of a rectangular box-shaped jig, indicated generally as 40, defined by a rectangular flat base 43, a sidewall 41, slotted end-plates 42 and 44, and another sidewall (not shown) identical to 41. The length of the sidewalls of jig 40 is such as to be slightly less than the distance between the chamfers on opposite end-portions of the rods so that the troughs 50, formed by the coinciding chamfers, are disposed beyond end-plates 42, 44 (more clearly shown in FIG. 6) and are readily accessible for deposition of weld material therein. The length of end plates 42, 44 may be of any length suitable to have as many slots as is desired such, for example, as 50 to 200 slots, although not limited thereto. Each of end plates 42 and 44 have a plurality of identical, equi-spaced, slots $a$, $b$, $c$, etc. and $a'$, $b'$, $c'$, etc., respectively with slots $a$, $b$, $c$, etc. being in linear alignment, respectively with slots $a'$, $b'$, $c'$, as shown in FIG. 5. The width of the slots in end-plates 42 and 44 is such as to conformingly receive the rods with a tight fit, while the depth of the slots is sufficient to receive a pair of the rods in superposition. The equi-spacing between the slots is determined by the consideration of two factors, namely sufficient space to enable accessibility between the protruding rod ends for deposition of weld material in the troughs and the effective cutting-width of a cutting tool inserted between the protruding rod ends to remove the excess weld material. A spacing of about ⅜ inch between slots has been found to be adequate for welding accessibility to the troughs and for enabling the utilization of a ⅜ inch milling bur to remove the excess weld material.

To facilitate the proper disposition and relative centering of the rods in jig 40, there is provided a rod-positioning assembly, generally indicated as 46, which is detachably secured to the sidewalls of jig 40 by wind-screw means 47, the assembly including backstops 48 and 49 for centering and linearly aligning rods 15 and rods 20, respectively. Of course, any other manner or means may be employed to center and align the rods.

In placing the rods in the jig 40, rods 15 are placed in the jig with the chamfers facing upward and are diagonally disposed so that one end portion of a rod 15 seats in slot $a'$ of end-plate 44 with the other end portion of the same rod resting in slot *b* of end-plate 42. The diagonal dispositioning of rods 15 is more clearly displayed in FIG. 5 by the rod 15 extending from slot *e'* of plate 44 to slot *f* of plate 42. Since slot *a* of plate 42 does not have a rod 15 seated therein, a filler or spacer 54 (FIG. 7) of the same cross-sectional dimensions as rods 15 is placed in slot *a*.

After all the rods 15 have been positioned in the jig, rods 20, with the chamfers faced downward, are superposed thereon by placing each of the rods 20 in linearly aligned slots of plates 42 and 44. For example, the rod 20 nearest sidewall 41 has one end 19 positioned in slot *a'* of plate 44 while end 21 of the same rod rests in slot *a* of plate 42. In this manner, the short rods 20 connect opposite ends of a pair of adjacent rods 15, as is evidenced by the relationship of rod 20 in slots *b-b'* to the pair of rods 15 which have one end positioned in slots *b* and *b'*, respectively. In placing rods 15 and 20 in the jig 40, they are pushed in end-abuttment with their respective backstops, 48 or 49, for centering and alignment with the result that the chamfers of rods 20 are supercoincident with the chamfers of rods 15 to form troughs 50, shown in FIG. 6; and, upon completion of the rod-positioning operation, the rod-positioning bracket 46 is detached from jig 40 to prepare the rod-jig assemblage for the weld depositing operation.

The jig 40 is then placed in a vertical position by setting sidewall 41 on a horizontal supporting table or other substantially horizontal supporting means. While in this position, all of the upwardly facing troughs 50 in both end-portions of the superposed rods are filled, by any conventional welding technique, with weld material. Upon solidification of the weld material, the jig 40 is rotated 180 degrees so as to rest on the opposite sidewall (not shown) in a vertical position with the unwelded troughs 50 facing upwardly, whereupon these troughs are accordingly filled with weld material. After completion of the welding operation, the jig 40 with the welded rods therein is then horizontally placed (as shown in FIG. 7) on the bed of a milling machine from which a burr or any other convenient cutting tool, of a size conforming to the spacing between the slots (⅜ inch in the described case), is passed between the rods to remove the excess weld from welded joints 18 whereby the welded joints are flush or coplanar with the sides at the end-portions of the welded rods.

Referring to FIG. 7, the welded rods in slot *b* illustrate the condition of weld joints 18 prior to the excess-weld removal operation; whereas, the welded rods in slot *d* depict the flush condition of weld joints 18 after the excess-weld removal operation. It is to be noted that one pass of a burr machines a pair of weld joints, as represented by the flush, oppositely faced, weld joints between slots *c* and *d* (FIG. 7).

It is also apparent from FIG. 7 that the rod 20 in slot *a* rests on spacer 54 and is not welded as yet. It also can be readily appreciated that the last slot at the other end (not shown) of end plate 42 has an end of one of rods 15 therein with a spacer positioned thereover. Thus, the opposite ends of the welded product in jig 40 are defined by an unwelded end of a short rod 20 and by an unwelded end of a long rod 15. At this stage, the welded product is removed from jig 40 and wrapped about a cylindrical mandrel having a diameter substantially conforming to that of the desired warhead, the aforesaid unconnected opposite ends of the welded product substantially supercoinciding to define between the chamfers thereof a trough which is welded and ground or machined flush, as affected on the aforedescribed welded joints. The completed product is a cylindrical warhead formed by a coaxial inner cylinder of short rods which are parallel to the longitudinal axis of the warhead, and by a coaxial outer cylinder of longer rods which are slightly aslant to the longitudinal axis of the warhead and which are each connected to the opposite ends of a pair of adjacent short rods whereby the warhead is adaptable to be extended into a closed loop by pivotal action of the rods upon the hinge weld joints.

It is apparent from FIG. 7 that the method of forming individual weld joints on the sides of the welded rods does not require the machining of spacers along with the welding material as required by the prior method and is much easier to machine than the prior method. Moreover, since the excess weld material formed on the spaced side-joints by the method of the instant invention is much less than that formed by the prior method and is readily removed merely by passing a conforming cutting or grinding tool between the equi-spaced rod-ends, it is obvious that the excess-weld removal operation in the method of the instant invention is considerably less-time-consuming than that of the prior art method. Furthermore, since the method of the present invention forms individual weld joints, the rod ends are not constrained or warped as is the case with the continuous weld of the prior art method.

Obviously, many modifications and variations of the present invention are possible in the light of the above teachings. It is therefore to be understood that, within the scope of the teachings herein and the appended claims, the invention may be practiced otherwise than as specifically described.

What is claimed as new and desired to be secured by Letters Patent of the United States is:

1. The method of welding a pair of superposed rods of square cross-section near an end-portion thereof to form a hinge joint thereat wherein one rod is longer than and extends beyond the other shorter rod comprising the steps of forming similar and transversely aligned chamfers on a pair of adjacent edges at one end of said shorter rod, forming similar and transversely aligned chamfers on a pair of adjacent edges near to but at a predetermined distance from an end of the longer rod, the length of the chamfers on said longer rod being substantially the same as the chamfers on said shorter rod, abutting the rods with each of the chamfers of said longer rod in supercoincident face-contiguity to the respective chamfers on said shorter rod thereby forming a pair of oppositely disposed troughs on each side of the superposed rods, and depositing weld material in each of said troughs.

2. The method of interconnecting opposing ends of a pair of metal rods with an intermediate metal rod to form hinge joints thereat comprising the steps of forming a pair of bevels adjacent the end to be welded on one of said pair of rods with said pair of bevels being disposed to have a common ridge therebetween, forming a pair of bevels adjacent the end to be welded on the other of said pair of rods with a common ridge between the bevels thereof, forming a pair of bevels on each end of said intermediate rod with each pair of bevels having a common ridge therebetween, positioning said pair of rods side-by-side with the ridges thereof substantially mutually coplanar but disposed at opposite ends, superposing said intermediate rod on said pair of rods with the ridge on each end thereof being in supercoincident face-adjacency to a respective ridge of said pair of rods whereby the bevels of the rods define a pair of oppositely disposed troughs at each end of said intermediate rod, and welding each end of said intermediate rod to a respective one of said pairs of rods by depositing weld material in said troughs.

3. The method of claim 2 wherein each of said pair of bevels are formed by similarly and transversely aligningly chamfering each of said pair of adjacent edges to a depth sufficient to retain a ridge therebetween.

4. The method of claim 3 wherein said pair of rods are of substantially equal predetermined length with their respective bevels being displaced an equal distance from their respective rod ends, and said intermediate rod being of a length less than said predetermined length but sufficient for the bevels on the opposite ends thereof to supercoincide with the bevels of said pair of rods when positioned side-by-side and superposed by said intermediate rod.

5. The method of forming a plurality of alternatingly-connected long and short rods of square cross-section by welding the ends of the short rods to respective ends of the long rods wherein all of said long rods are of substantially identical dimensions and all of said short rods are of substantially identical dimensions but less in length than the long rods by a predetermined amount, said method comprising the steps of substantially identically chamfering a pair of adjacent edges at each end of each of said short rods to form a pair of transversely aligned bevel surfaces with a ridge therebetween on each end of each of said short rods, identically chamfering a pair of adjacent edges at a predetermined distance from each end of each of said long rods to form a pair of transversely aligned bevel surfaces with a ridge therebetween near each end of each of said long rods, said predetermined distance being substantially half said predetermined amount, fixedly positioning all of said long rods in side-by-side parallel equi-spaced relationship with all of the ridges thereon being upwardly coplanar and the ends thereof in alignment to form an array of equi-spaced long rods, fixedly superpositioningly centering on said array of long rods all of said short rods in side-by-side parallel equi-spaced relationship with all of the ridges thereon being downwardly coplanar and the ends thereof in alignment, the disposition of the short rods relative to the long rods being such that the ridges on opposite ends of each short rod rest in face-opposite end-portions of an adjacent pair of long rods so that the pair of bevel surfaces at each end of the short rods coincide with a respective pair of bevel surfaces at the end-portions of the long rods thereby to define a weld trough on each side of the superposed rods at each end-portion thereof, welding the end-portions together by filling the troughs with weld material, and removing the excess material by passing between the end-portions of the rods a metal-removing tool having a width substantially conforming to the spacing between the long rods thereby forming an expansible product defined by a plurality of alternatingly-connected long and short rods of which the remote ends are unconnected.

6. The method of making a continuous rod warhead comprising the steps of claim 5 and further including the steps of forming said expansible product into a cylinder with the long rods defining an outer cylinder and the short rods an inner cylinder, and welding together said unconnected remote ends.

References Cited by the Examiner

UNITED STATES PATENTS

| | | | |
|---|---|---|---|
| 1,546,393 | 7/1925 | Maisenbacher | 29—485 X |
| 2,025,555 | 12/1935 | Stahl | 29—485 X |
| 2,145,009 | 1/1939 | Keir | 29—491 X |
| 2,180,486 | 11/1939 | Tench | 219—58 X |
| 2,280,150 | 4/1942 | Hasse | 29—491 X |
| 2,434,321 | 1/1948 | Kleiner | 29—491 X |
| 2,577,123 | 12/1951 | Hitchens | 219—59 X |
| 2,642,652 | 6/1953 | Davis | 29—482 |

BENJAMIN A. BORCHELT, *Primary Examiner.*

ARTHUR M. HORTON, *Examiner.*